United States Patent
Kakihara et al.

(10) Patent No.: US 6,187,707 B1
(45) Date of Patent: Feb. 13, 2001

(54) BARIUM TITANATE-BASED SEMICONDUCTIVE CERAMIC COMPOSITION

(75) Inventors: Satoshi Kakihara, Youkaichi; Toshiharu Hirota, Hikone; Yasuhiro Nabika, Omihachiman; Noriyuki Yamamoto, Shiga-ken, all of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/308,513

(22) PCT Filed: Nov. 6, 1997

(86) PCT No.: PCT/JP97/04030

§ 371 Date: May 20, 1999

§ 102(e) Date: May 20, 1999

(87) PCT Pub. No.: WO98/22411

PCT Pub. Date: May 28, 1998

(30) Foreign Application Priority Data

Nov. 20, 1996 (JP) .................................................. 8-309556
Jan. 14, 1997 (JP) ...................................................... 9-4933

(51) Int. Cl.$^7$ ................................................. C04B 35/468
(52) U.S. Cl. ............................................................ 501/138
(58) Field of Search ................................................. 501/138

(56) References Cited

FOREIGN PATENT DOCUMENTS

| 55-046524 | 4/1980 | (JP) . |
| 4042501 | 2/1992 | (JP) . |
| 4104951 | 4/1992 | (JP) . |
| 5051254 | 3/1993 | (JP) . |
| 5070223 | 3/1993 | (JP) . |

Primary Examiner—David Brunsman

(57) ABSTRACT

A barium titanate-based semiconductive ceramic composition for facilitating miniaturization of thermistor devices by improving rush current resistance characteristics is provided. In the barium titanate-based semiconductive ceramic composition, a fraction of the Ba in $BaTiO_3$ as the major component is replaced with 1 to 25 mole percent of Ca, 1 to 30 mole percent of Sr, and 1 to 50 mole percent of Pb; and wherein to 100 mole percent of the major component, the semiconductivity-imparting agent is added in an amount of 0.2 to 1.0 mole percent as a converted element content, and the additive comprises manganese oxide in an amount of 0.01 to 0.10 mole percent as a converted Mn content, silica in an amount of 0.5 to 5 mole percent as a converted $SiO_2$ content, and magnesium oxide in an amount of 0.028 to 0.093 mole percent as a converted Mg content.

2 Claims, 1 Drawing Sheet

BARIUM TITANATE-BASED SEMICONDUCTIVE CERAMIC COMPOSITION

TECHNICAL FIELD

The present invention generally relates to semiconductive ceramic compositions, and more specifically to a barium titanate-based semiconductive ceramic composition.

BACKGROUND ART

The following conventional barium titanate-based semiconductive ceramic compositions are known. Japanese Patent Publication No. 62-43522 discloses a barium titanate-based semiconductive ceramic composition, which is substantially composed of $BaTiO_3$ or in which Pb is partly substituted for Ba, and which contains 0.00035 to 0.0072 percent by weight of magnesium when the weight of the composition is 100, for the purpose of increasing withstand voltage.

Japanese Patent Publication No. 63-28324 discloses a barium titanate-based semiconductive ceramic composition containing 30 to 95 mole percent of $BaTiO_3$ as the major component, 3 to 25 mole percent of $CaTiO_3$, 1 to 30 mole percent of $SrTiO_3$, and 1 to 50 mole percent of $PbTiO_3$, in which a fraction of Ba is replaced with Ca, Sr and Pb in order to improve withstand voltage and rush current resistance characteristics.

Furthermore, Japanese Patent Publication No. 62-58642 discloses a semiconductive ceramic composition having a rush current which is not large, and a positive resistance-versus-temperature property with a small change over time in an intermittent test, in which Ba in barium titanate is replaced with 1 to 50 mole percent of Pb and 0.1 to 1.0 mole percent of Mg.

Japanese Patent Application Laid-Open No. 2-48464 discloses a semiconductive ceramic composition, in which a fraction of the Ba in $BaTiO_3$ is replaced with 0.001 to 0.1 atomic percent of Mg and 0.01 to 2.0 atomic percent of Ca, a fraction of Ba is replaced with 0.01 to 5.0 atomic percent of Pb and 0.01 to 20 atomic percent of Ca, or a fraction of Ba is replaced with 0.001 to 0.1 atomic percent of Mg, 0.01 to 5.0 atomic percent of Pb, and 0.01 to 2.0 atomic percent of Ca to reduce a change in resistance with temperature within an operational environment temperature range and to reduce specific resistance at ordinary temperatures.

Japanese Patent Application Laid-Open No. 2-48465 discloses a barium titanate-based semiconductive ceramic composition, in which a fraction of the Ba in $BaTiO_3$ is replaced with 0.001 to 0.1 atomic percent of Mg, a fraction of Ba is replaced with 0.01 to 5.0 atomic percent of Pb, or a fraction of Ba is replaced with 0.001 to 0.1 atomic percent of Mg and 0.01 to 5.0 atomic percent of Pb to reduce a change in resistance with temperature within an operational environment temperature range.

With miniaturization and high-density trends in recent electronic devices, miniaturization of positive coefficient thermistor devices composed of barium titanate-based semiconductive ceramic compositions used in the electronic devices has also progressed. However, miniaturization of positive coefficient thermistors causes deterioration of rush current resistance characteristics (flash withstand voltage characteristics); hence, no conventional positive coefficient thermistor meets commercial miniaturization requirements.

DISCLOSURE OF INVENTION

It is an object of the present invention to provide a barium titanate-based semiconductive ceramic composition having improved rush current resistance characteristics, thus facilitating miniaturization of positive coefficient thermistor devices.

The present invention has been completed to achieve such an object.

A barium titanate-based semiconductive ceramic composition in accordance with the present invention comprises a major component composed of barium titanate or a solid solution thereof, a semiconductivity-imparting agent, and an additive, wherein a fraction of the Ba in $BaTiO_3$ as the major component is replaced with 1 to 25 mole percent of Ca, 1 to 30 mole percent of Sr, and 1 to 50 mole percent of Pb, and wherein to 100 mole percent of the major component, the semiconductivity-imparting agent is added in an amount of 0.2 to 1.0 mole percent as a converted element content, and the additive comprises manganese oxide in an amount of 0.01 to 0.10 mole percent as a converted Mn content, silica in an amount of 0.5 to 5 mole percent as a converted $SiO_2$ content, and magnesium oxide in an amount of 0.028 to 0.093 mole percent as a converted Mg content.

In the barium titanate-based semiconductive ceramic composition in accordance with the present invention, the semiconductivity-imparting agent is preferably at least one element selected from the group consisting of Y, La, Ce, Nb, Bi, Sb, W, Th, Ta, Dy, Gd, Nd, and Sm.

BEST MODE FOR CARRYING OUT THE INVENTION

Figure 1:
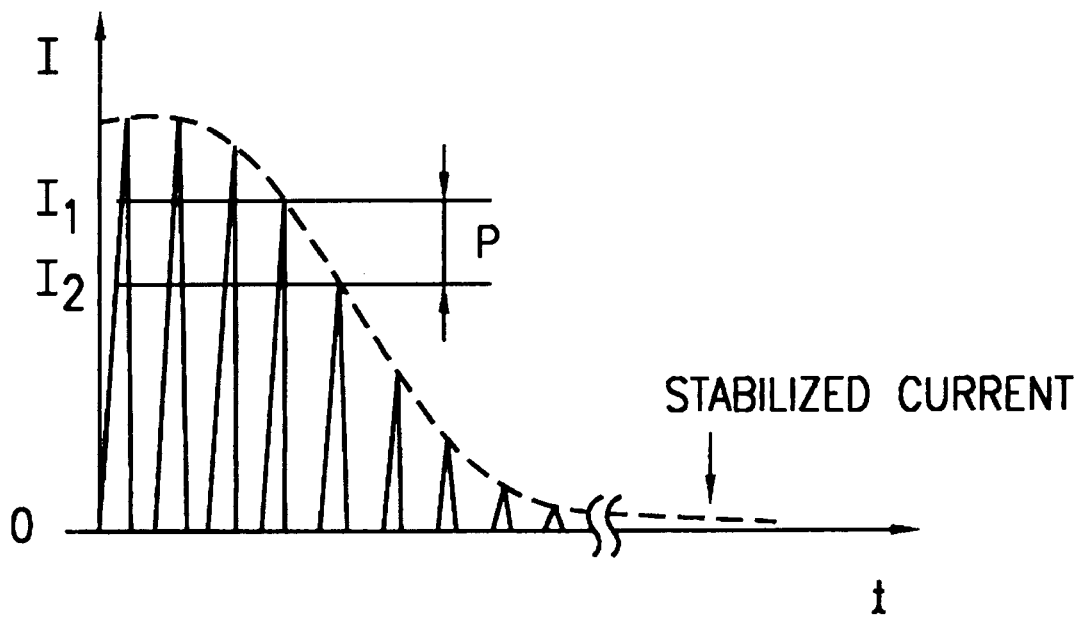
FIG. 1 is a graph showing the relationship between the current of a positive coefficient thermistor device and the time of measurement.

The embodiments of the present invention will now be described.

The barium titanate-based semiconductive ceramic composition in accordance with the present invention contains a major component composed of barium titanate or a solid solution thereof, in which a fraction of Ba is replaced with Ca, Sr, and Pb in the above-described amounts (mole percent), a semiconductivity-imparting agent, and an additive. The additive comprises manganese oxide, silica and magnesium oxide in the above-described amounts (mole percent). Such a composition facilitates improvement in rush current resistance characteristics, and thus facilitates miniaturization of positive coefficient thermistors.

By the partial replacement of Ba with Pb, Ca and Sr and the addition of Mg, the rush current resistance characteristics can be significantly improved compared to the conventional cases using only one or two components among these components together with Mg.

When the total amount is 100 mole percent, the amount of the major component is the value after subtracting the total mole percent of the semiconductivity-imparting agent and the additive from 100 mole percent.

Various semiconductivity-imparting agents may be used without limitation in the present invention. Examples of the semiconductivity-imparting agents include Y, La, Ce, Nb, Bi, Sb, W, Th, Ta, Dy, Gd, Nd and Sm.

The present invention will now be described in more detail with reference to the following examples; however, the present invention is not limited to these examples.

As raw materials, $BaCO_3$, $CaCO_3$, $Pb_3O_4$, $SrCO_3$, and $TiO_2$ as the major components, $Y_2O_3$, $La_2O_3$, $Er_2O_3$, and $Nd_2O_3$ as the semiconductivity-imparting agents, and MnCO$_3$, SiO$_2$, and MgCO$_3$ as the additives were prepared. These raw materials were compounded and then wet-mixed to prepare semiconductive ceramic compositions having the formulations shown in Tables 1 to 4. The compositions were dehydrated, dried, and then calcined at 1,100 to 1,200° C. for 2 hours. The calcined compositions were pulverized, wet-mixed with binders, granulated, and then compacted under a compaction pressure of 1,000 kg/cm$^2$ to form disks. The resulting disks were fired at 1,300 to 1,400° C. to form disk semiconductor ceramics having a diameter of 11.5 mm and a thickness of 2.2 mm.

Ni—Ag layered electrodes including an electroless nickel plating layer (first layer) and a silver baking layer (second layer) are formed on the two faces of each semiconductive ceramic.

Each sample was subjected to resistance measurement at room temperature (25° C.), withstand voltage characteristic, Curie temperature, and rush current resistance characteristic (flash withstand voltage characteristic), and the results are shown in Tables 5 to 8.

Among these characteristics, the withstand voltage characteristic means the maximum applied voltage just before the sample is broken when a voltage applied to the sample is gradually increased. The rush current resistance characteristic means the maximum voltage (flash resistance voltage) not causing breakage of the semiconductive ceramic when an alternate rush voltage is applied to the sample. Samples marked with an *(asterisk) are outside the scope of the present invention.

TABLE 1

| | Major Components (mole percent) | | | | Semiconductivity-imparting agent | Additives (mole percent) | | |
|---|---|---|---|---|---|---|---|---|
| Sample | BaTiO$_3$ | CaTiO$_3$ | SrTiO$_3$ | PbTiO$_3$ | (mole percent) | Mn | SiO$_2$ | Mg |
| *1 | 87 | 0 | 8 | 5 | Y: 0.4 | 0.05 | 2 | 0 |
| *2 | 87 | 0 | 8 | 5 | Y: 0.4 | 0.05 | 2 | 0.0028 |
| *3 | 87 | 0 | 8 | 5 | Y: 0.4 | 0.05 | 2 | 0.093 |
| *4 | 86 | 1 | 8 | 5 | Y: 0.4 | 0.05 | 2 | 0 |
| 5 | 86 | 1 | 8 | 5 | Y: 0.4 | 0.05 | 2 | 0.0028 |
| 6 | 86 | 1 | 8 | 5 | Y: 0.4 | 0.05 | 2 | 0.093 |
| *7 | 86 | 1 | 8 | 5 | Y: 0.4 | 0.05 | 2 | 0.150 |
| 8 | 84 | 3 | 8 | 5 | Y: 0.4 | 0.05 | 2 | 0.0028 |
| 9 | 84 | 3 | 8 | 5 | Y: 0.4 | 0.05 | 2 | 0.093 |
| *10 | 82 | 5 | 8 | 5 | Y: 0.4 | 0.05 | 2 | 0.28 |
| 11 | 72 | 15 | 8 | 5 | Y: 0.4 | 0.05 | 2 | 0 |
| 12 | 72 | 15 | 8 | 5 | Y: 0.4 | 0.05 | 2 | 0.00028 |
| *13 | 72 | 15 | 8 | 5 | Y: 0.4 | 0.05 | 2 | 0.0028 |
| 14 | 72 | 15 | 8 | 5 | Y: 0.4 | 0.05 | 2 | 0.028 |
| *15 | 72 | 15 | 8 | 5 | Y: 0.4 | 0.05 | 2 | 0.150 |
| 16 | 67 | 20 | 8 | 5 | Y: 0.4 | 0.05 | 2 | 0.028 |
| *17 | 62 | 25 | 8 | 5 | Y: 0.4 | 0.05 | 2 | 0.00028 |
| *18 | 62 | 25 | 8 | 5 | Y: 0.4 | 0.05 | 2 | 0.028 |
| *19 | 62 | 25 | 8 | 5 | Y: 0.4 | 0.05 | 2 | 0.150 |
| *20 | 57 | 30 | 8 | 5 | Y: 0.4 | 0.05 | 2 | 0.028 |
| *21 | 57 | 30 | 8 | 5 | Y: 0.4 | 0.05 | 2 | 0.093 |
| *22 | 80 | 15 | 0 | 5 | Y: 0.4 | 0.05 | 2 | 0 |
| 23 | 80 | 15 | 0 | 5 | Y: 0.4 | 0.05 | 2 | 0.093 |
| 24 | 79 | 15 | 1 | 5 | Y: 0.4 | 0.05 | 2 | 0 |
| 25 | 79 | 15 | 1 | 5 | Y: 0.4 | 0.05 | 2 | 0.0028 |
| 26 | 79 | 15 | 1 | 5 | Y: 0.4 | 0.05 | 2 | 0.093 |
| *27 | 78 | 15 | 2 | 5 | Y: 0.4 | 0.05 | 2 | 0.0028 |
| 28 | 78 | 15 | 2 | 5 | Y: 0.4 | 0.05 | 2 | 0.093 |
| *29 | 70 | 15 | 10 | 5 | Y: 0.4 | 0.05 | 2 | 0 |
| *30 | 70 | 15 | 10 | 5 | Y: 0.4 | 0.05 | 2 | 0.0028 |
| 31 | 70 | 15 | 10 | 5 | Y: 0.4 | 0.05 | 2 | 0.150 |
| *32 | 55 | 15 | 25 | 5 | Y: 0.4 | 0.05 | 2 | 0 |
| *33 | 55 | 15 | 25 | 5 | Y: 0.4 | 0.05 | 2 | 0.093 |
| 34 | 50 | 15 | 30 | 5 | Y: 0.4 | 0.05 | 2 | 0 |
| 35 | 50 | 15 | 30 | 5 | Y: 0.4 | 0.05 | 2 | 0.00028 |
| *36 | 50 | 15 | 30 | 5 | Y: 0.4 | 0.05 | 2 | 0.0028 |
| *37 | 50 | 15 | 30 | 5 | Y: 0.4 | 0.05 | 2 | 0.028 |
| *38 | 45 | 15 | 35 | 5 | Y: 0.4 | 0.05 | 2 | 0 |
| *39 | 45 | 15 | 35 | 5 | Y: 0.4 | 0.05 | 2 | 0.0028 |

TABLE 2

| Sample | Major Components (mole percent) | | | | Semiconductivity-imparting agent (mole percent) | Additives (mole percent) | | |
|---|---|---|---|---|---|---|---|---|
| | BaTiO$_3$ | CaTiO$_3$ | SrTiO$_3$ | PbTiO$_3$ | | Mn | SiO$_2$ | Mg |
| *40 | 45 | 15 | 35 | 5 | Y: 0.4 | 0.05 | 2 | 0.093 |
| *41 | 77 | 15 | 8 | 0 | Y: 0.4 | 0.05 | 2 | 0 |
| 42 | 77 | 15 | 8 | 0 | Y: 0.4 | 0.05 | 2 | 0.0028 |
| 43 | 76 | 15 | 8 | 1 | Y: 0.4 | 0.05 | 2 | 0 |
| 44 | 76 | 15 | 8 | 1 | Y: 0.4 | 0.05 | 2 | 0.0028 |
| 45 | 76 | 15 | 8 | 1 | Y: 0.4 | 0.05 | 2 | 0.093 |
| 46 | 75 | 15 | 8 | 2 | Y: 0.4 | 0.05 | 2 | 0.0028 |
| 47 | 75 | 15 | 8 | 2 | Y: 0.4 | 0.05 | 2 | 0.093 |
| 48 | 67 | 15 | 8 | 10 | Y: 0.4 | 0.05 | 2 | 0.028 |
| 49 | 57 | 15 | 8 | 20 | Y: 0.4 | 0.05 | 2 | 0.028 |
| 50 | 47 | 15 | 8 | 30 | Y: 0.4 | 0.05 | 2 | 0.0028 |
| 51 | 47 | 15 | 8 | 30 | Y: 0.4 | 0.05 | 2 | 0.093 |
| *52 | 42 | 15 | 8 | 35 | Y: 0.4 | 0.05 | 2 | 0.028 |
| 53 | 37 | 15 | 8 | 40 | Y: 0.4 | 0.05 | 2 | 0.093 |
| *54 | 37 | 15 | 8 | 40 | Y: 0.4 | 0.05 | 2 | 0.150 |
| 55 | 32 | 15 | 8 | 45 | Y: 0.4 | 0.05 | 2 | 0.028 |
| *56 | 27 | 15 | 8 | 50 | Y: 0.4 | 0.05 | 2 | 0 |
| *57 | 27 | 15 | 8 | 50 | Y: 0.4 | 0.05 | 2 | 0.0028 |
| *58 | 22 | 15 | 8 | 60 | Y: 0.4 | 0.05 | 2 | 0 |
| *59 | 22 | 15 | 8 | 60 | Y: 0.4 | 0.05 | 2 | 0.0028 |
| *60 | 22 | 15 | 8 | 60 | Y: 0.4 | 0.05 | 2 | 0.093 |
| *61 | 72 | 15 | 8 | 5 | Y: 0.1 | 0.05 | 2 | 0 |
| 62 | 72 | 15 | 8 | 5 | Y: 0.1 | 0.05 | 2 | 0.0028 |
| 63 | 72 | 15 | 8 | 5 | Y: 0.2 | 0.05 | 2 | 0.00028 |
| *64 | 72 | 15 | 8 | 5 | Y: 0.2 | 0.05 | 2 | 0.0028 |
| *65 | 72 | 15 | 8 | 5 | Y: 0.2 | 0.05 | 2 | 0.028 |
| 66 | 72 | 15 | 8 | 5 | Y: 0.2 | 0.05 | 2 | 0.150 |
| 67 | 72 | 15 | 8 | 5 | Y: 0.3 | 0.05 | 2 | 0 |
| *68 | 72 | 15 | 8 | 5 | Y: 0.3 | 0.05 | 2 | 0.093 |
| *69 | 72 | 15 | 8 | 5 | Y: 0.8 | 0.05 | 2 | 0.093 |
| 70 | 72 | 15 | 8 | 5 | Y: 1.0 | 0.05 | 2 | 0 |
| 71 | 72 | 15 | 8 | 5 | Y: 1.0 | 0.05 | 2 | 0.00028 |
| 72 | 72 | 15 | 8 | 5 | Y: 1.0 | 0.05 | 2 | 0.0028 |
| *73 | 72 | 15 | 8 | 5 | Y: 1.0 | 0.05 | 2 | 0.028 |
| *74 | 72 | 15 | 8 | 5 | Y: 1.0 | 0.05 | 2 | 0.093 |
| *75 | 72 | 15 | 8 | 5 | Y: 1.0 | 0.05 | 2 | 0.150 |
| *76 | 72 | 15 | 8 | 5 | Y: 1.2 | 0.05 | 2 | 0 |
| *77 | 72 | 15 | 8 | 5 | Y: 1.2 | 0.05 | 2 | 0.028 |
| 78 | 74 | 12 | 10 | 4 | Er: 0.1 | 0.05 | 2 | 0.028 |
| *79 | 74 | 12 | 10 | 4 | Er: 0.2 | 0.05 | 2 | 0 |

TABLE 3

| Sample | Major Components (mole percent) | | | | Semiconductivity-imparting agent (mole percent) | Additives (mole percent) | | |
|---|---|---|---|---|---|---|---|---|
| | BaTiO$_3$ | CaTiO$_3$ | SrTiO$_3$ | PbTiO$_2$ | | Mn | SiO$_2$ | Mg |
| *80 | 74 | 12 | 10 | 4 | Er: 0.2 | 0.05 | 2 | 0.028 |
| *81 | 74 | 12 | 10 | 4 | Er: 0.2 | 0.05 | 2 | 0.150 |
| 82 | 74 | 12 | 10 | 4 | Er: 0.4 | 0.05 | 2 | 0 |
| 83 | 74 | 12 | 10 | 4 | Er: 0.4 | 0.05 | 2 | 0.00028 |
| 84 | 74 | 12 | 10 | 4 | Er: 0.4 | 0.05 | 2 | 0.0028 |
| *85 | 74 | 12 | 10 | 4 | Er: 0.4 | 0.05 | 2 | 0.028 |
| *86 | 74 | 12 | 10 | 4 | Er: 0.4 | 0.05 | 2 | 0.093 |
| *87 | 74 | 12 | 10 | 4 | Er: 0.4 | 0.05 | 2 | 0.150 |
| *88 | 74 | 12 | 10 | 4 | Er: 0.4 | 0.05 | 2 | 0.200 |
| 89 | 74 | 12 | 10 | 4 | Er: 0.4 | 0.05 | 2 | 0.280 |
| 90 | 74 | 12 | 10 | 4 | Er: 1.0 | 0.05 | 2 | 0 |
| *91 | 74 | 12 | 10 | 4 | Er: 1.0 | 0.05 | 2 | 0.0028 |
| *92 | 74 | 12 | 10 | 4 | Er: 1.0 | 0.05 | 2 | 0.093 |
| *93 | 74 | 12 | 10 | 4 | Er: 1.0 | 0.05 | 2 | 0.150 |
| *94 | 74 | 12 | 10 | 4 | Er: 1.2 | 0.05 | 2 | 0 |
| *95 | 74 | 12 | 10 | 4 | Er: 1.2 | 0.05 | 2 | 0.028 |

TABLE 3-continued

| | Major Components (mole percent) | | | | Semiconductivity-imparting agent | Additives (mole percent) | | |
|---|---|---|---|---|---|---|---|---|
| Sample | BaTiO$_3$ | CaTiO$_3$ | SrTiO$_3$ | PbTiO$_3$ | (mole percent) | Mn | SiO$_2$ | Mg |
| *96 | 72 | 15 | 8 | 5 | La:0.1 | 0.05 | 2 | 0 |
| 97 | 72 | 15 | 8 | 5 | La:0.1 | 0.05 | 2 | 0.0028 |
| 98 | 72 | 15 | 8 | 5 | La: 0.2 | 0.05 | 2 | 0 |
| *99 | 72 | 15 | 8 | 5 | La: 0.2 | 0.05 | 2 | 0.0028 |
| *100 | 72 | 15 | 8 | 5 | La: 0.2 | 0.05 | 2 | 0.093 |
| 101 | 72 | 15 | 8 | 5 | La: 0.2 | 0.05 | 2 | 0.150 |
| 102 | 72 | 15 | 8 | 5 | La: 0.5 | 0.05 | 2 | 0 |
| *103 | 72 | 15 | 8 | 5 | La: 0.5 | 0.05 | 2 | 0.0028 |
| *104 | 72 | 15 | 8 | 5 | La: 0.5 | 0.05 | 2 | 0.093 |
| *105 | 72 | 15 | 8 | 5 | La: 0.5 | 0.05 | 2 | 0.150 |
| *106 | 72 | 15 | 8 | 5 | La:1.2 | 0.05 | 2 | 0 |
| 107 | 72 | 15 | 8 | 5 | La:1.2 | 0.05 | 2 | 0.028 |
| 108 | 72 | 15 | 8 | 5 | Nd: 0.4 | 0.05 | 2 | 0 |
| *109 | 72 | 15 | 8 | 5 | Nd: 0.4 | 0.05 | 2 | 0.0028 |
| *110 | 72 | 15 | 8 | 5 | Nd: 0.4 | 0.05 | 2 | 0.093 |
| *111 | 72 | 15 | 8 | 5 | Nd: 0.4 | 0.05 | 2 | 0.150 |
| *112 | 72 | 15 | 8 | 5 | Y: 0.4 | 0.005 | 2 | 0 |
| *113 | 72 | 15 | 8 | 5 | Y: 0.4 | 0.005 | 2 | 0.0028 |
| 114 | 72 | 15 | 8 | 5 | Y: 0.4 | 0.005 | 2 | 0.093 |
| 115 | 72 | 15 | 8 | 5 | Y: 0.4 | 0.01 | 2 | 0 |
| *116 | 72 | 15 | 8 | 5 | Y: 0.4 | 0.01 | 2 | 0.0028 |
| *117 | 72 | 15 | 8 | 5 | Y: 0.4 | 0.01 | 2 | 0.093 |
| *118 | 72 | 15 | 8 | 5 | Y: 0.4 | 0.01 | 2 | 0.150 |
| 119 | 72 | 15 | 8 | 5 | Y: 0.4 | 0.10 | 2 | 0 |

TABLE 4

| | Major Components (mole percent) | | | | Semiconductivity-imparting agent | Additives (mole percent) | | |
|---|---|---|---|---|---|---|---|---|
| Sample | BaTiO$_3$ | CaTiO$_3$ | SrTiO$_3$ | PbTiO$_3$ | (mole percent) | Mn | SiO$_2$ | Mg |
| 120 | 72 | 15 | 8 | 5 | Y: 0.4 | 0.10 | 2 | 0.00028 |
| *121 | 72 | 15 | 8 | 5 | Y: 0.4 | 0.10 | 2 | 0.0028 |
| *122 | 72 | 15 | 8 | 5 | Y: 0.4 | 0.10 | 2 | 0.093 |
| *123 | 72 | 15 | 8 | 5 | Y: 0.4 | 0.10 | 2 | 0.150 |
| *124 | 72 | 15 | 8 | 5 | Y: 0.4 | 0.12 | 2 | 0 |
| *125 | 72 | 15 | 8 | 5 | Y: 0.4 | 0.12 | 2 | 0.028 |
| *126 | 72 | 15 | 8 | 5 | Y: 0.4 | 0.12 | 0.2 | 0 |
| *127 | 72 | 15 | 8 | 5 | Y: 0.4 | 0.12 | 0.2 | 0.0028 |
| *128 | 72 | 15 | 8 | 5 | Y: 0.4 | 0.12 | 0.2 | 0.093 |
| *129 | 72 | 15 | 8 | 5 | Y: 0.4 | 0.12 | 0.5 | 0 |
| *130 | 72 | 15 | 8 | 5 | Y: 0.4 | 0.12 | 0.5 | 0.0028 |
| *131 | 72 | 15 | 8 | 5 | Y: 0.4 | 0.12 | 0.5 | 0.093 |
| *132 | 72 | 15 | 8 | 5 | Y: 0.4 | 0.12 | 0.5 | 0.150 |
| *133 | 72 | 15 | 8 | 5 | Y: 0.4 | 0.12 | 5 | 0 |
| *134 | 72 | 15 | 8 | 5 | Y: 0.4 | 0.12 | 5 | 0.00028 |
| *135 | 72 | 15 | 8 | 5 | Y: 0.4 | 0.12 | 5 | 0.0028 |
| *136 | 72 | 15 | 8 | 5 | Y: 0.4 | 0.12 | 5 | 0.028 |
| *137 | 72 | 15 | 8 | 5 | Y: 0.4 | 0.12 | 5 | 0.093 |
| *138 | 72 | 15 | 8 | 5 | Y: 0.4 | 0.12 | 5 | 0.150 |
| *139 | 72 | 15 | 8 | 5 | Y: 0.4 | 0.12 | 8 | 0 |
| *140 | 72 | 15 | 8 | 5 | Y: 0.4 | 0.12 | 8 | 0.028 |

TABLE 5

| Sample | Resistance (Ω) | Withstand voltage (V) | Curie point (° C.) | Rush current resistance characteristic (V) |
|---|---|---|---|---|
| *1 | 5.7 | 200 | 125 | 180 |
| *2 | 5.1 | 180 | 125 | 180 |
| *3 | 5.1 | 180 | 125 | 200 |
| *4 | 5.8 | 200 | 125 | 225 |
| 5 | 5.4 | 200 | 125 | 315 |
| 6 | 5.2 | 200 | 125 | 315 |
| *7 | 14.3 | 315 | 125 | 250 |
| 8 | 7.3 | 250 | 129 | 355 |
| 9 | 7.1 | 250 | 129 | 355 |
| 10 | +∞ | — | — | — |

TABLE 5-continued

| Sample | Resistance (Ω) | Withstand voltage (V) | Curie point (° C.) | Rush current resistance characteristic (V) |
|---|---|---|---|---|
| 11 | 7.7 | 355 | 127 | 250 |
| 12 | 9.6 | 355 | 127 | 250 |
| *13 | 9.4 | 315 | 127 | 400 |
| 14 | 9.4 | 315 | 127 | 400 |
| *15 | 22.6 | 355 | 127 | 315 |
| 16 | 10.8 | 400 | 127 | 315 |
| *17 | 11.6 | 400 | 126 | 355 |
| *18 | 11.0 | 400 | 126 | 450 |
| *19 | 27.1 | 355 | 126 | 355 |
| *20 | 88.5 | 450 | 124 | 315 |
| *21 | 89.3 | 450 | 124 | 315 |
| *22 | 7.1 | 250 | 136 | 150 |
| 23 | 6.1 | 250 | 136 | 150 |
| 24 | 8.6 | 250 | 136 | 200 |
| 25 | 8.2 | 250 | 136 | 315 |
| 26 | 7.9 | 250 | 136 | 315 |
| *27 | 8.2 | 250 | 136 | 355 |
| 28 | 7.9 | 250 | 136 | 315 |
| *29 | 10.8 | 450 | 135 | 355 |
| *30 | 9.4 | 450 | 134 | 500 |
| 31 | 35.5 | 400 | 135 | 400 |
| *32 | 12.0 | 500 | 56 | 355 |
| *33 | 10.6 | 500 | 56 | 500 |
| 34 | 13.2 | 500 | 54 | 355 |
| 35 | 13.5 | 500 | 54 | 355 |
| *36 | 11.8 | 450 | 53 | 500 |
| *37 | 10.2 | 500 | 55 | 500 |
| *38 | 19.0 | 630 | 55 | 400 |
| *39 | 18.3 | 630 | 56 | 400 |

TABLE 6

| Sample | Resistance (Ω) | Withstand voltage (V) | Curie point (° C.) | Rush current resistance characteristic (V) |
|---|---|---|---|---|
| *40 | 18.5 | 630 | 54 | 400 |
| *41 | 6.1 | 224 | 91 | 120 |
| 42 | 5.7 | 224 | 90 | 120 |
| 43 | 6.3 | 250 | 90 | 150 |
| 44 | 5.7 | 250 | 91 | 250 |
| 45 | 5.5 | 280 | 90 | 225 |
| 46 | 6.1 | 225 | 102 | 250 |
| 47 | 5.7 | 225 | 103 | 250 |
| 48 | 13.5 | 560 | 141 | 500 |
| 49 | 21.0 | 630 | 195 | 630 |
| 50 | 26.9 | 710 | 233 | 900 |
| 51 | 26.5 | 710 | 231 | 900 |
| *52 | 34.2 | 800 | 239 | 1,000 |
| 53 | 39.5 | 800 | 258 | 1,000 |
| *54 | 180.6 | 560 | 258 | 710 |
| 55 | 43.4 | 800 | 281 | 1,000 |
| *56 | 82.5 | 500 | 298 | 900 |
| *57 | 68.5 | 500 | 296 | 1,000 |
| *58 | 491.9 | — | — | — |
| *59 | 517.5 | — | — | — |
| *60 | 505.7 | — | — | — |
| *61 | 7.1K | — | — | — |
| 62 | 7.1K | — | — | — |
| 63 | 18.1 | 560 | 123 | 500 |
| *64 | 17.5 | 560 | 124 | 710 |
| *65 | 17.3 | 560 | 124 | 630 |
| 66 | 43.4 | 500 | 123 | 500 |
| 67 | 16.7 | 500 | 122 | 450 |
| *68 | 15.3 | 500 | 124 | 630 |
| *69 | 20.4 | 560 | 123 | 710 |
| 70 | 22.2 | 630 | 123 | 500 |
| 71 | 21.6 | 630 | 123 | 500 |
| 72 | 19.2 | 560 | 122 | 630 |
| *73 | 18.8 | 560 | 124 | 630 |
| *74 | 18.3 | 560 | 124 | 630 |
| *75 | 50.3 | 500 | 122 | 500 |

TABLE 6-continued

| Sample | Resistance (Ω) | Withstand voltage (V) | Curie point (° C.) | Rush current resistance characteristic (V) |
|---|---|---|---|---|
| *76 | 1.3K | — | — | — |
| *77 | 1.2K | — | — | — |
| 78 | 5.7K | — | — | — |
| *79 | 13.2 | 630 | 126 | 450 |

TABLE 7

| Sample | Resistance (Ω) | Withstand voltage (V) | Curie point (° C.) | Rush current resistance characteristic (V) |
|---|---|---|---|---|
| *80 | 12.2 | 630 | 127 | 630 |
| *81 | 57.5 | 500 | 127 | 400 |
| 82 | 11.4 | 630 | 127 | 400 |
| 83 | 12.0 | 630 | 128 | 400 |
| 84 | 9.8 | 560 | 127 | 630 |
| *85 | 9.4 | 630 | 127 | 630 |
| *86 | 10.0 | 560 | 128 | 710 |
| *87 | 17.7 | 500 | 127 | 450 |
| *88 | 65.8 | 560 | 127 | 500 |
| 89 | +∞ | — | — | — |
| 90 | 14.7 | 630 | 129 | 450 |
| *91 | 13.5 | 560 | 128 | 630 |
| *92 | 13.0 | 560 | 129 | 710 |
| *93 | 68.7 | 630 | 129 | 500 |
| *94 | 842.0 | — | — | — |
| *95 | 803.8 | — | — | — |
| *96 | 5.7K | — | — | — |
| 97 | 5.1K | — | — | — |
| 98 | 9.2 | 500 | 124 | 450 |
| *99 | 8.4 | 500 | 122 | 560 |
| *100 | 8.2 | 500 | 125 | 560 |
| 101 | 31.2 | 500 | 124 | 450 |
| 102 | 11.8 | 630 | 124 | 450 |
| *103 | 10.4 | 630 | 124 | 630 |
| *104 | 10.8 | 630 | 124 | 580 |
| *105 | 54.2 | 500 | 123 | 450 |
| *106 | 777.3 | — | — | — |
| 107 | 815.5 | — | — | — |
| 108 | 9.4 | 560 | 125 | 315 |
| *109 | 8.4 | 500 | 125 | 500 |
| *110 | 8.2 | 500 | 124 | 500 |
| *111 | 28.1 | 500 | 125 | 400 |
| *112 | 16.5 | 355 | 120 | 180 |
| *113 | 15.1 | 355 | 120 | 180 |
| 114 | 14.8 | 355 | 120 | 180 |
| 115 | 18.1 | 560 | 121 | 355 |
| *116 | 16.9 | 560 | 123 | 500 |
| *117 | 16.3 | 560 | 121 | 500 |
| *118 | 89.1 | 450 | 121 | 450 |
| 119 | 21.0 | 630 | 122 | 500 |

TABLE 8

| Sample | Resistance (Ω) | Withstand voltage (V) | Curie point (° C.) | Rush current resistance characteristic (V) |
|---|---|---|---|---|
| 120 | 21.4 | 630 | 121 | 500 |
| *121 | 19.6 | 630 | 121 | 800 |
| *122 | 19.2 | 630 | 122 | 800 |
| *123 | 109.2 | 500 | 121 | 560 |
| *124 | 80.7 | 800 | 121 | 800 |
| *125 | 75.6 | 800 | 121 | 800 |
| *126 | 247.2 | — | 122 | — |
| *127 | 245.8 | — | 122 | — |
| *128 | 235.2 | — | 121 | — |
| *129 | 82.3 | 1,000 | 121 | 800 |
| *130 | 71.5 | 1,000 | 120 | 800 |
| *131 | 72.8 | 1,000 | 120 | 800 |

TABLE 8-continued

| Sample | Resistance (Ω) | Withstand voltage (V) | Curie point (° C.) | Rush current resistance characteristic (V) |
|---|---|---|---|---|
| *132 | 437.6 | 800 | 121 | 800 |
| *133 | 55.6 | 900 | 120 | 710 |
| *134 | 56.3 | 900 | 119 | 710 |
| *135 | 51.6 | 900 | 119 | 630 |
| *136 | 50.3 | 900 | 119 | 630 |
| *137 | 49.1 | 800 | 120 | 630 |
| *138 | 217.1 | 800 | 119 | 630 |
| *139 | Melted | — | — | — |
| *140 | Melted | — | — | — |

The reasons for the numerical limitations of the scope of the composition in accordance with the present invention will now be described.

In the major component comprising barium titanate or a solid solution thereof, a fraction of the Ba in $BaTiO_3$ is replaced with 1 to 25 mole percent of Ca, 1 to 30 mole percent of Sr, and 1 to 50 mole percent of Pb for the following reasons.

When the Ca content is less than 1 mole percent, the effects of the addition are insufficient and the rush current resistance characteristic is lower than the withstand voltage characteristic, as shown in Samples 1, 2 and 3.

On the other hand, a Ca content of higher than 25 mole percent causes a significant increase in resistance and rush current resistance characteristics lower than a withstand voltage characteristic, as shown in Samples 20 and 21.

When the Sr content is less than 1 mole percent, the rush current resistance characteristic is lower than the withstand voltage characteristic, as shown in Samples 22 and 23. In Samples 22 and 23, Sr is not added. It is confirmed that the rush current resistance characteristic is also lower than the withstand voltage characteristic due to insufficient addition when less than 1 mole percent of Sr is added.

On the other hand, a Sr content of higher than 30 mole percent causes a significant increase in resistance and rush current resistance characteristics lower than a withstand voltage characteristic, as shown in Samples 38, 39 and 40.

When the Pb content is less than 1 mole percent, the rush current resistance characteristic is lower than the withstand voltage characteristic, as shown in Samples 41 and 42. In samples 41 and 42, Pb is not added. It is confirmed that the rush current resistance characteristic is also lower than the withstand voltage characteristic due to the insufficient addition, when less than 1 mole percent of Pb is added.

On the other hand, when the Pb content is more than 50 mole percent, semiconductors are not formed, as shown in Samples 58, 59 and 60.

Next, the amount of the added semiconductivity-imparting agent is limited to 0.2 to 1 mole percent to 100 mole percent of the major component for the following reasons.

When the amount is less than 0.2 mole percent, no semiconductor is produced due to insufficient effects of the addition and the resistance is extraordinarily high, as shown in Samples 61, 62, 78, 96 and 97.

On the other hand, when the amount is more than 1.0 mole percent, resistance is extraordinarily high, resulting in deterioration of the withstand voltage and rush current resistance characteristics, as shown in Samples 76, 77, 94, 95, 106 and 107.

Next, the amount of manganese as the additive is limited to 0.01 to 0.10 mole percent (converted to Mn) with respect to 100 mole percent of the major component for the following reasons.

When the amount is less than 0.01 mole percent, change in resistance with temperature is small, and this is not practical due to insufficient effects of the addition, as shown in Samples 112, 113, and 114.

On the other hand, when the amount is more than 0.10 mole percent, resistance is extraordinarily high for practical use, as shown in Samples 124 to 140.

Next, the amount as a converted $SiO_2$ content of silica as the additive is limited to 0.5 to 5 mole percent with respect to 100 mole percent of the major component for the following reasons.

When the amount is less than 0.5 mole percent, the effects of the addition are insufficient and a change in specific resistance caused by a slight change in the conductor-imparting agent content cannot be sufficiently suppressed, as shown in Samples 126, 127 and 128.

On the other hand, when the amount is more than 0.10 mole percent, change in specific resistance cannot be sufficiently suppressed, as shown in Samples 139 and 140.

Next, the amount as a converted Mg content of magnesium oxide as the additive is limited to 0.0028 to 0.093 mole percent with respect to 100 mole percent of the major component for the following reasons.

When the amount is less than 0.0028 mole percent, no improvement in the characteristics is observed due to a trace amount of additive, as shown in Samples 1, 4, 11, 12, 17, 22, 24, 29, 32, 34, 35, 38, 41, 43, 56, 58, 61, 63, 67, 70, 71, 76, 79, 82, 83, 90, 94, 96, 98, 102, 106, 108, 112, 115, 119, 120, 124, 126, 129, 133, 134 and 139.

On the other hand, when the amount is higher than 0.093 mole percent, resistance is significantly increased due to excessive addition, as shown in Samples 7, 10, 15, 19, 31, 54, 66, 75, 81, 87, 88, 89, 93, 101, 105, 111, 118, 123, 132 and 138.

In Table 9, samples based on Example 3 in Japanese Patent Publication No. 62-43522 as Comparative Samples were subjected to measurements of flash withstand voltage characteristics as in the above method. Table 9 also shows the Curie point (Tc) and the specific resistance (ρ). The amounts in each composition are represented by mole percent.

TABLE 9

| | Major component (mole percent) | | | | | | Electrical characteristics | | Flash withstand |
|---|---|---|---|---|---|---|---|---|---|
| Sample | Ba | Pb | R | $SiO_2$ | Mn | Mg | Tc(° C.) | ρ(Ωcm) | voltage (V) |
| 201 | 89.7 | 10 | Y: 0.3 | 1 | 0.03 | 0 | 170 | 67 | 180 |
| 202 | 89.7 | 10 | Y: 0.3 | 1 | 0.03 | 0.003 | 170 | 63 | 180 |
| 203 | 89.7 | 10 | Y: 0.3 | 1 | 0.03 | 0.004 | 169 | 62 | 180 |

TABLE 9-continued

| | Major component (mole percent) | | | | | | Electrical characteristics | | Flash withstand |
|---|---|---|---|---|---|---|---|---|---|
| Sample | Ba | Pb | R | SiO$_2$ | Mn | Mg | Tc(° C.) | ρ(Ωcm) | voltage (V) |
| 204 | 89.7 | 10 | Y: 0.3 | 1 | 0.03 | 0.028 | 169 | 63 | 180 |
| 205 | 89.7 | 10 | Y: 0.3 | 1 | 0.03 | 0.093 | 169 | 75 | 200 |
| 206 | 89.7 | 10 | Y: 0.3 | 1 | 0.03 | 0.150 | 168 | 200 | 250 |
| 207 | 89.7 | 10 | Y; 0.3 | 1 | 0.03 | 0.200 | 167 | 1.9 × 10$^3$ | — |

According to these Comparative Samples, sufficient flash withstand voltage is not achieved in Ba—Pb-based barium titanate semiconductive ceramic compositions even when the amount as a converted Mg content of magnesium is 0.028 to 0.056 mole percent.

In Table 10, Ba—Pb—Sr—Ca-based samples having substantially the same ρ and Tc values as those in Table 9 were prepared and subjected to measurement of flash withstand voltage characteristics as in the above method.

TABLE 10

| | Major component (mole percent) | | | | | | | | Electrical characteristics | | Flash withstand |
|---|---|---|---|---|---|---|---|---|---|---|---|
| Sample | Ba | Pb | Sr | Ca | R | SiO$_2$ | Mn | Mg | Tc(° C.) | ρ(Ωcm) | voltage (V) |
| 208 | 66.6 | 12 | 8 | 15 | Y: 0.4 | 2 | 0.05 | 0 | 170 | 64 | 315 |
| 209 | 66.6 | 12 | 8 | 15 | Y: 0.4 | 2 | 0.05 | 0.003 | 170 | 59 | 400 |
| 210 | 66.6 | 12 | 8 | 15 | Y: 0.4 | 2 | 0.05 | 0.064 | 170 | 57 | 450 |
| 211 | 66.6 | 12 | 8 | 15 | Y: 0.4 | 2 | 0.05 | 0.014 | 169 | 53 | 450 |
| 212 | 66.6 | 12 | 8 | 15 | Y: 0.4 | 2 | 0.05 | 0.028 | 169 | 52 | 500 |
| 213 | 66.6 | 12 | 8 | 15 | Y: 0.4 | 2 | 0.05 | 0.093 | 168 | 56 | 500 |
| 214 | 66.6 | 12 | 8 | 15 | Y: 0.4 | 2 | 0.05 | 0.150 | 168 | 120 | 355 |
| 215 | 66.6 | 12 | 8 | 15 | Y: 0.4 | 2 | 0.05 | 0.200 | 167 | 600 | 355 |

These Ba—Pb—Sr—Ca-based samples result in improvement in flash withstand voltage characteristics and greater improvement in the flash withstand voltage characteristics when Mg is added within a range of the present invention.

In Table 11, samples containing only Ba as the major component (Samples 216 and 217), Ba—Sr-based samples (Samples 218 and 219), Ba—Ca-based samples (Samples 220 and 221), Ba—Pb—Sr-based samples (Samples 222 and 223), Ba—Pb—Ca-based samples (Samples 224 and 225), Ba—Sr—Ca-based samples (Samples 226 and 227), Ba—Pb-based samples (Samples 228 and 229), and Ba—Pb—Sr—Ca-based samples (Samples 230 and 231) were prepared and subjected to measurement of the flash withstand voltage characteristic as in the above method.

TABLE 11

| | Major component (mole percent) | | | | | | | | Electrical characteristics | | Flash withstand |
|---|---|---|---|---|---|---|---|---|---|---|---|
| Sample | Ba | Pb | Sr | Ca | R | SiO$_2$ | Mn | Mg | Tc(° C.) | ρ(Ωcm) | voltage (V) |
| 216 | 100 | 0 | 0 | 0 | Y: 0.4 | 2 | 0.05 | 0 | 129 | 22 | 70 |
| 217 | 100 | 0 | 0 | 0 | Y: 0.4 | 2 | 0.05 | 0.0028 | 129 | 21 | 70 |
| 218 | 92 | 0 | 8 | 0 | Y: 0.4 | 2 | 0.05 | 0 | 100 | 20 | 120 |
| 219 | 92 | 0 | 8 | 0 | Y: 0.4 | 2 | 0.05 | 0.0028 | 100 | 19 | 120 |
| 220 | 85 | 0 | 0 | 15 | Y: 0.4 | 2 | 0.05 | 0 | 128 | 22 | 100 |
| 221 | 85 | 0 | 0 | 15 | Y: 0.4 | 2 | 0.05 | 0.0028 | 128 | 19 | 70 |
| 222 | 87 | 5 | 8 | 0 | Y: 0.4 | 2 | 0.05 | 0 | 131 | 35 | 180 |
| 223 | 87 | 5 | 8 | 0 | Y: 0.4 | 2 | 0.05 | 0.0028 | 131 | 32 | 150 |
| 224 | 80 | 5 | 0 | 15 | Y: 0.4 | 2 | 0.05 | 0 | 136 | 34 | 150 |
| 225 | 80 | 5 | 0 | 15 | Y: 0.4 | 2 | 0.05 | 0.0028 | 136 | 36 | 150 |
| 226 | 77 | 0 | 8 | 15 | Y: 0.4 | 2 | 0.05 | 0 | 91 | 29 | 120 |
| 227 | 77 | 0 | 8 | 15 | Y: 0.4 | 2 | 0.05 | 0.0028 | 90 | 27 | 120 |
| 228 | 95 | 5 | 0 | 0 | Y: 0.4 | 2 | 0.05 | 0 | 138 | 23 | 100 |
| 229 | 95 | 5 | 0 | 0 | Y: 0.4 | 2 | 0.05 | 0.0028 | 138 | 21 | 100 |

TABLE 11-continued

| | Major component (mole percent) | | | | | | | Electrical characteristics | | |
|---|---|---|---|---|---|---|---|---|---|---|
| Sample | Ba | Pb | Sr | Ca | R | SiO$_2$ | Mn | Mg | Tc(° C.) | ρ(Ωcm) | Flash withstand voltage (V) |
| 230 | 72 | 5 | 8 | 15 | Y: 0.4 | 2 | 0.05 | 0 | 127 | 36 | 250 |
| 231 | 2 | 5 | 8 | 15 | Y: 0.4 | 2 | 0.05 | 0.0028 | 127 | 33 | 400 |

Barium titanate-based semiconductive ceramic compositions containing Ba—Pb—Sr—Ca major components result in satisfactory flash withstand voltage characteristic when the magnesium content as a converted Mg content is 0.028 mole percent.

Using samples selected at random from Tables 1 to 4, disk devices provided with Ni–Ag electrodes were prepared and subjected to measurement of current attenuation characteristic (P$_{max}$) and stabilized current characteristic, and the results are shown in Table 12.

Herein, the current attenuation characteristic (P$_{max}$) is the maximum value of the envelope variations P=I$_1$–I2 wherein I$_1$ is a peak value and I$_2$ is the adjacent peak value, and the stabilized current characteristic is a current flowing in the circuit at three minutes from the start of the measurement.

TABLE 12

| Sample | Resistance (Ω) | P$_{max}$ (A) Acceptance criterion: <3.4 A | Stabilized current (mA$_{p-p}$) Acceptance criterona: <4.9 mA |
|---|---|---|---|
| *70 | 22.2 | 3.5 | 2.4 |
| *71 | 21.6 | 3.6 | 2.2 |
| 72 | 19.2 | 3.3 | 1.6 |
| 73 | 18.8 | 3.2 | 1.7 |
| 74 | 18.3 | 3.2 | 1.7 |
| *75 | 50.3 | 3.0 | 9.3 |
| *82 | 11.4 | 3.9 | 5.6 |
| *53 | 12.0 | 4.1 | 5.6 |
| 84 | 9.8 | 3.4 | 4.8 |
| 85 | 9.4 | 3.3 | 4.8 |
| 86 | 10.0 | 3.4 | 4.9 |
| *87 | 17.7 | 2.8 | 7.5 |
| *88 | 65.8 | 2.6 | 8.6 |
| *89 | +∞ | — | — |
| *115 | 18.1 | 3.8 | 2.7 |
| 116 | 16.9 | 3.4 | 2.3 |
| 117 | 16.3 | 3.4 | 2.2 |
| *118 | 89.1 | 3.0 | 8.2 |

As shown in Table 12, samples containing the major components, the semiconductivity-imparting agent and the additives other than magnesium within the above-described range, and containing 0.0028 to 0.093 mole percent as a converted Mg content of magnesium, have superior current attenuation (P$_{max}$) and stabilized current characteristics.

Use of the barium titanate-based semiconductive ceramic composition in accordance with the present invention facilitates further miniaturization of thermistor devices because of further improvement in the rush current characteristic (flash withstand voltage characteristic).

Since superior current attenuation and stabilized current characteristics are also achieved, electrical reliability is further improved.

Industrial Applicability

As described above, the barium titanate-based semiconductive ceramic composition in accordance with the present invention is applicable to a wide variety of electronic devices, for example, positive coefficient thermistor devices.

What is claimed is:

1. A barium titanate-based semiconductive ceramic composition comprising a major component composed of barium titanate or a solid solution thereof, a semiconductivity-imparting agent, and an additive;

wherein a fraction of the Ba in BaTiO$_3$ as the major component is replaced with 1 to 25 mole percent of Ca, 1 to 30 mole percent of Sr, and 1 to 50 mole percent of Pb; and wherein to 100 mole percent of the major component, the semiconductivity-imparting agent is added in an amount of 0.2 to 1.0 mole percent as a converted element content, and the additive comprises manganese oxide in an amount of 0.01 to 0.10 mole percent as a converted Mn content, silica in an amount of 0.5 to 5 mole percent as a converted SiO$_2$ content, and magnesium oxide in an amount of 0.028 to 0.093 mole percent as a converted Mg content.

2. A barium titanate-based semiconductive ceramic composition according to claim 1, wherein the semiconductivity-imparting agent is at least one element selected from the group consisting of Y, La, Ce, Nb, Bi, Sb, W, Th, Ta, Dy, Gd, Nd, and Sm.

* * * * *